United States Patent
Kopp et al.

(10) Patent No.: US 8,218,921 B2
(45) Date of Patent: Jul. 10, 2012

(54) DUAL TWIST SINGLE HELIX OPTICAL FIBER GRATING

(75) Inventors: Victor Il'ich Kopp, Fair Lawn, NJ (US); Jonathan Singer, New Hope, PA (US); Christopher Draper, Allendale, NJ (US); Victor M. Churikov, Wyckoff, NJ (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 545 days.

(21) Appl. No.: 12/502,651

(22) Filed: Jul. 14, 2009

(65) Prior Publication Data

US 2010/0008627 A1    Jan. 14, 2010

Related U.S. Application Data

(60) Provisional application No. 61/080,671, filed on Jul. 14, 2008.

(51) Int. Cl.
G02B 6/00 (2006.01)
G02B 6/02 (2006.01)
G02B 6/34 (2006.01)

(52) U.S. Cl. .......................................... 385/37; 385/123
(58) Field of Classification Search .................... 385/27, 385/28, 37, 42, 43, 123–128
See application file for complete search history.

(56) References Cited

U.S. PATENT DOCUMENTS

| 4,630,889 A * | 12/1986 | Hicks, Jr. ....................... 385/123 |
| 6,396,859 B1 * | 5/2002 | Kopp et al. ....................... 372/39 |
| 6,411,635 B1 * | 6/2002 | Kopp et al. ....................... 372/39 |
| 6,493,486 B1 * | 12/2002 | Chen ................................. 385/37 |
| 6,839,486 B2 * | 1/2005 | Kopp et al. ....................... 385/37 |
| 6,925,230 B2 * | 8/2005 | Kopp et al. ....................... 385/37 |
| 7,095,911 B2 * | 8/2006 | Kopp et al. ....................... 385/11 |
| 7,463,800 B2 * | 12/2008 | Kopp et al. ....................... 385/37 |
| 2002/0071881 A1 * | 6/2002 | Kopp et al. ....................... 425/66 |
| 2002/0131707 A1 * | 9/2002 | Kopp et al. ....................... 385/37 |
| 2011/0292676 A1 * | 12/2011 | Weiner et al. .................. 362/558 |
| 2011/0293219 A1 * | 12/2011 | Weiner et al. .................... 385/31 |

* cited by examiner

*Primary Examiner* — Akm Ullah
(74) *Attorney, Agent, or Firm* — Edward Etkin, Esq.

(57) ABSTRACT

A single helix chiral fiber grating of a predetermined grating strength is provided that is operable to control light transmission in a predetermined wavelength range. The novel fiber grating comprises a first optical fiber with a first interface portion at a first end, a second interface portion at a second end, and a middle portion therebetween. The first optical fiber is configured with at least one fiber core, surrounded by a corresponding at least one cladding, with a first longitudinal section disposed within the first interface portion, a second longitudinal section disposed within the second interface portion, and also includes a longitudinal helical section, disposed therebetween within the middle portion, that comprises a longitudinal helix structure of a single predetermined handedness, having a predetermined pitch profile, and having a predetermined helix diameter profile selected and configured to produce the predetermined grating strength. The helical section of the novel fiber grating is preferably produced by placing the first optical fiber, proximal to and parallel with a second fiber (or equivalent elongated member), and longitudinally twisting them together to form a double helix structure. Advantageously, the diameter of the second fiber (or a diameter profile thereof) may be selected to achieve the predetermined helix diameter profile in the helical section of the first fiber. The second fiber may be left proximal to the first fiber after fabrication or removed.

6 Claims, 2 Drawing Sheets

DUAL TWIST SINGLE HELIX OPTICAL FIBER GRATING

CROSS REFERENCE TO RELATED APPLICATIONS

The present patent application claims priority from the commonly assigned U.S. provisional patent application 61/080,671 entitled "Dual Twist Single Helix Optical Fiber Grating", filed Jul. 14, 2008.

FIELD OF THE INVENTION

The present invention relates generally to fiber grating type structures, and more particularly to an optical fiber grating having chiral properties and having a single helix refractive index modulation.

BACKGROUND OF THE INVENTION

Fiber gratings are incorporated into components that form the backbone of modern information and communications technologies, and are suitable for a wide range of applications, such as information processing and optical fiber communication systems utilizing wavelength division multiplexing (WDM). There are many different fiber grating types and configurations. For example, fiber Bragg gratings are useful in lasing, filtering and sensing applications. Various Bragg grating configurations also include chirped fiber gratings useful in chromatic dispersion compensators and apodized fiber gratings that are used to eliminate sidelobes in signal transmission spectra.

Another type of fiber grating—a long period grating—is of particular interest in sensing and filtering applications. Light passing through a long period grating is modified rather than reflected, as occurs in fiber Bragg gratings. Also, unlike a fiber Bragg grating, a long period grating is typically used for coupling the mode of the fiber core into the fiber cladding. A long period grating has a spectral characteristic with multiple transmission gaps. The positions of these gaps along the spectral range depend on the refractive index of a medium outside the cladding of the fiber. Thus, changing the outside refractive index produces a shift in the transmission gaps. Typically, the period of a long period grating is significantly longer than the wavelength of light passing through the grating.

Utilizing novel techniques disclosed in a number of commonly assigned and patents and co-pending patent applications, all of which are incorporated herein by reference in their entirety single helix long period gratings may be fabricated by twisting a fiber with a circular off-centered core. The single helix configuration is advantageous for sensing and gain-flattening applications because of its robustness, low cost and polarization insensitivity. However, in practice, it is difficult to create and maintain the core offset to obtain desirable long period grating characteristics. In addition, increasing the core offset results in excessive coupling losses to conventional, concentric fibers. Moreover, selecting a particular helix diameter for the resulting grating requires design and pre-fabrication of a perform with a particular core offset value. A change in the desired helix diameter requires preparation of an entirely new perform configuration. Additionally, fiber structures with non-concentric cores are difficult to splice with conventional fibers with concentric cores.

It would thus be desirable to provide a single helix fiber grating and a method of fabrication thereof that addresses all of the above challenges.

BRIEF DESCRIPTION OF THE DRAWINGS

In the drawings, wherein like reference characters denote corresponding or similar elements throughout the various figures.

SUMMARY OF THE INVENTION

The present invention is directed to a single helix chiral fiber grating of a predetermined grating strength that is operable to control light transmission in a predetermined wavelength range. The novel fiber grating comprises a first optical fiber with a first interface portion at a first end, a second interface portion at a second end, and a middle portion therebetween. The first optical fiber is configured with at least one fiber core, surrounded by a corresponding at least one cladding, with a first longitudinal section disposed within the first interface portion, a second longitudinal section disposed within the second interface portion, and also includes a longitudinal helical section, disposed therebetween within the middle portion, that comprises a longitudinal helix structure of a single predetermined handedness, having a predetermined pitch profile, and having a predetermined helix diameter profile selected and configured to produce the predetermined grating strength.

The helical section of the novel fiber grating is preferably produced by placing the first optical fiber, proximal to and parallel with a second fiber (or equivalent elongated member), and longitudinally twisting them together to form a double helix structure. Advantageously, the diameter of the second fiber (or a diameter profile thereof) may be selected to achieve the predetermined helix diameter profile in the helical section of the first fiber. The second fiber may be left proximal to the first fiber after fabrication or removed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to a single helix chiral fiber grating of a predetermined grating strength that is configured for controlling light transmission in a predetermined wavelength range. The single helix chiral fiber grating addresses all of the drawbacks of previously known single helix fiber gratings in that it readily interfaces with any conventional fiber with a centrally concentric core, and that enables easy selection, not only of a helical pitch profile, but also a selection and implementation of a diameter profile, along its length without any need for specially prepared performs.

Figure 1A:
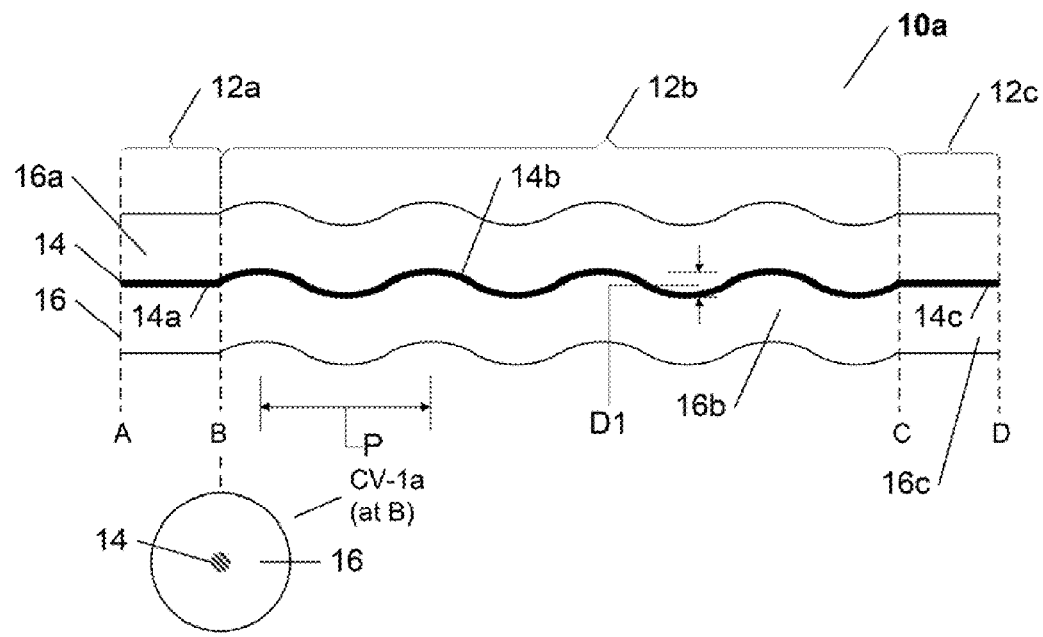
FIG. 1A shows schematic diagrams of a side view, and of a cross sectional view, of a first exemplary embodiment of the single helix optical fiber grating of the present invention.

Referring now to FIG. 1A, the novel fiber grating 10a comprises a first optical fiber 12a-12c, with a first interface portion 12a at a first end, a second interface portion 12c at a second end, and a middle portion 12b therebetween. The first optical fiber 12a-12c is configured with at least one fiber core 14, surrounded by a corresponding classing 16, with a first longitudinal core section 14a (and cladding section 16a) disposed within the first interface portion 12a, a second longitudinal core section 14c (and cladding section 16c) disposed within the second interface portion 12c, and also includes a longitudinal helical core section 14b (and cladding section 16b), disposed therebetween within the middle portion 12b, that comprises a longitudinal helix structure of a single predetermined handedness, having a predetermined pitch P profile, and having a predetermined helix diameter D1 profile selected and configured to produce the predetermined grating strength, but that has a core 14 that is concentric to the classing 16 at each end A and D of the fiber grating 10a.

Figure 1B:
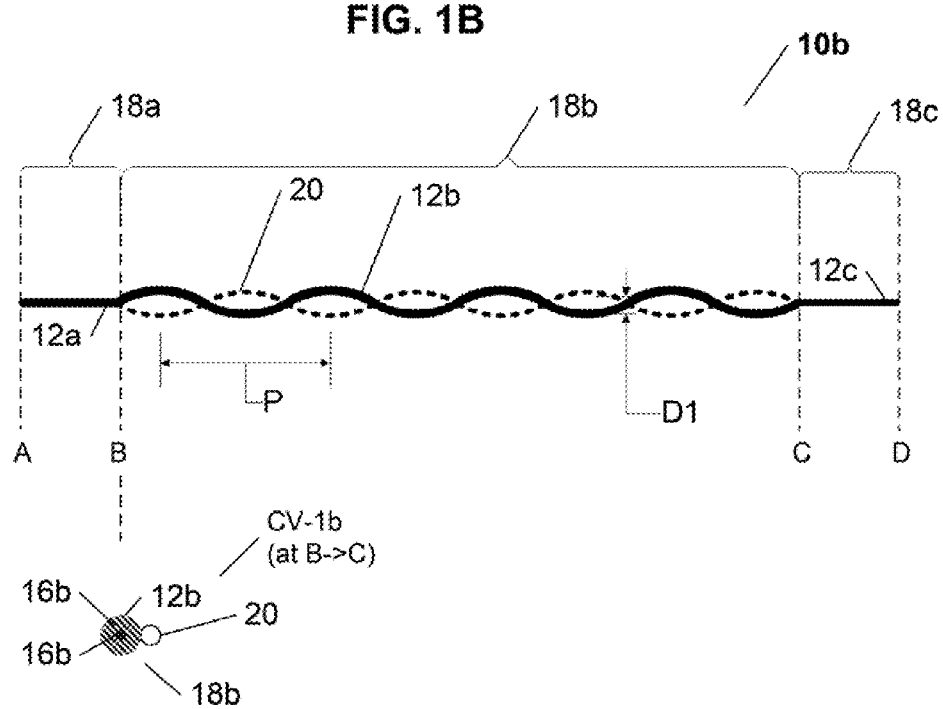
FIG. 1B shows schematic diagrams of a side view, and of a cross-sectional view, of an alternate embodiment of the inventive single helix optical fiber grating of FIG. 1A.

Referring now to FIG. 1B, an exemplary novel fabrication technique that may be advantageously utilized to produce the helical fiber grating 10a of FIG. 1A, is discussed in conjunction with a description of a helical fiber grating 10b. A helical section 18b of the novel fiber grating 10a is preferably produced by placing the first optical fiber 12a-12c of FIG. 1, proximal to and parallel with a second fiber 20 (or equivalent elongated member), and longitudinally twisting them together to form a double helix structure between points B and C. Advantageously, the diameter D1 of the second fiber 20 (or a diameter profile thereof) may be selected to achieve the predetermined helix diameter profile in the helical section 12b of the first fiber 12a-13c. The second fiber 20 may be left proximal to the first fiber 12a-12c after fabrication, or removed.

Advantageously, the novel fabrication technique enables the use of any conventional or specialty fiber (for example an EDFA fiber) as the first fiber 12a-12c to create the helical fiber grating 10a (such as a long-period grating), while providing the flexibility of a custom perform. By way of example, the first fiber 12a to 12c may be any one of conventional single mode fiber, an amplifying fiber, a radiation resistant fiber, a high-temperature resistant fiber, or a micro-structured fiber.

The second "auxiliary" fiber 20 may be any optical fiber, or may even be an elongated element such as a stress member. The diameter of the second fiber 20, may control the grating strength (which may vary along the helical section 12b/18b), while the helical pitch thereof may control the grating resonant wavelength.

Figure 2A:
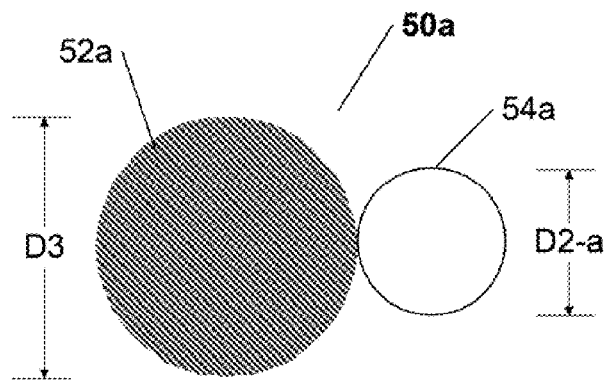
FIGS. 2A-2C each show a different embodiment of an optical fiber perform that may be advantageously utilized, in accordance with the novel fabrication methodology of the present invention, to fabricate the inventive single helix optical fiber grating of FIG. 1A or 1B, and of various alternate embodiments thereof.
Figure 2B:
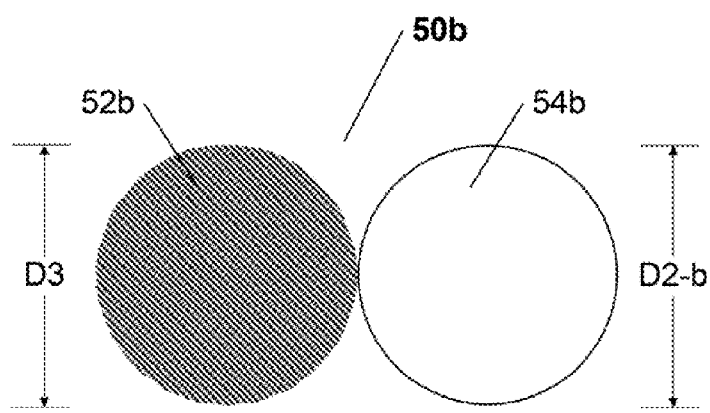
Figure 2C:
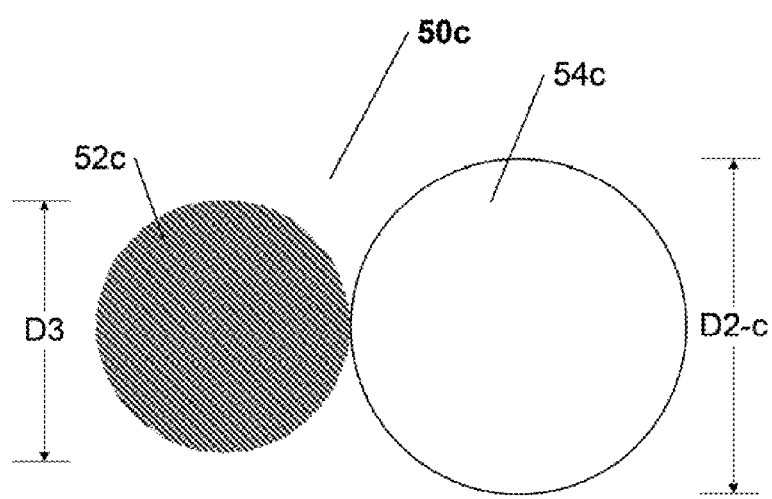

Referring now to FIGS. 2A-2C, three exemplary first and second fiber pre-twist assemblies 50a to 50c are shown to illustrate that relative diameters (D3 of the first fiber 52a-52c) may be smaller, equal to, or greater than the respective diameters D2-a to D2-c of different embodiments of the second fiber 54a to 54c, as a matter of design choice.

It should be noted that the helix diameter profile D1 (which as was noted before may vary along the helical section 12b/18b), alternately be configured/determined by techniques other than selection of a diameter/diameter profile value for the second fiber 20 without departing from the spirit of the invention. For example, the helix diameter may be determined by other factors such as differences (or similarities) in the following characteristics between the first and the second fibers: melting points, softening points, viscosity of cores and claddings, and stiffness.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral fiber grating of a predetermined grating strength configured for controlling light transmission in a predetermined wavelength range, comprising:
    a first optical fiber having a first interface portion at a first end, a second interface portion at a second end, and having a middle portion therebetween, said first optical fiber comprising:
        at least one fiber core, having a first longitudinal section disposed within said first interface portion, a second longitudinal section disposed within said second interface portion, and a longitudinal helical section, disposed therebetween within said middle portion, and comprising a longitudinal helix structure of a single predetermined handedness, having a predetermined pitch profile, and a predetermined helix diameter profile selected and configured to produce the predetermined grating strength; and
    a cladding longitudinally surrounding said at least one fiber core in each of said first and second longitudinal sections and in said longitudinal helical section, wherein said at least one fiber core is substantially concentric to said corresponding at least one cladding in regions in each of said first and said second sections that are proximal to each respective end of said longitudinal helical section.

2. The chiral fiber grating of claim 1, wherein middle portion further comprises a second fiber in close proximity, and parallel to the said first optical fiber.

3. The chiral fiber grating of claim 2, wherein said both first and second fibers are twisted together to form a double helical structure, wherein each of said first and second fibers forms an individual single helix structure.

4. The chiral fiber grating of claim 3, wherein, a diameter profile of said second fiber is selected to achieve said predetermined helix diameter profile.

5. The chiral fiber grating of claim 3, wherein said predetermined helix diameter profile is determined by at least one correlation between at least one characteristic of each of said first and second fibers, selected from a group comprising: melting point, softening point, viscosity of core and cladding, and stiffness.

6. The chiral fiber grating of claim 1, wherein said first optical fiber is selected from a group comprising: a conventional single mode fiber, an amplifying fiber, a radiation resistant fiber, a high-temperature resistant fiber, and a micro-structured fiber.

* * * * *